INVENTOR
Fromund Hock

Feb. 23, 1971   F. HOCK   3,565,568
METHOD AND APPARATUS FOR ASCERTAINING GEOMETRIC DEVIATIONS
FROM AN IDEAL SURFACE BY OPTICAL MEANS
Filed Nov. 2, 1967   2 Sheets-Sheet 2

INVENTOR
Fromund Hock
BY
Krafft & Wells
ATTORNEYS

United States Patent Office 3,565,568
Patented Feb. 23, 1971

3,565,568
METHOD AND APPARATUS FOR ASCERTAINING GEOMETRIC DEVIATIONS FROM AN IDEAL SURFACE BY OPTICAL MEANS
Fromund Hock, Wetzlar, Germany, assignor to Firma Ernst Leitz G.m.b.H., Wetzlar, Germany
Filed Nov. 2, 1967, Ser. No. 680,159
Claims priority, application Germany, Nov. 10, 1966, L 55,021
Int. Cl. G01n 21/40, 21/48; G01b 11/30
U.S. Cl. 356—118
5 Claims

ABSTRACT OF THE DISCLOSURE

A method and apparatus for determining the size of geometric deviations of a reflecting surface from an ideal surface comprising:
 (a) exposing the reflecting surface to light rays of definite solid angle and image area;
 (b) separating light reflected from the reflecting surface to a first component comprising light reflected regularly from the ideal surface, and a second component comprising light irregularly reflected and (or) scattered from deviations from the ideal surface; and
 (c) determining the ratio or difference between the first component and the second component and recording the ratio or difference.

CROSS-REFERENCE TO A RELATED APPLICATION

Applicant claims priority under 35 U.S.C. 119 for application Ser. No. L 55,021 IXb/42b, filed Nov. 10, 1966 in the Patent Office of the Federal Republic of Germany.

BACKGROUND OF THE INVENTION

The field of the invention includes optical testing instruments and the measurement and testing irregularities or hardness indentations of surfaces.

SUMMARY OF THE INVENTION

Having in mind the limitations of the prior art wherein complex combinations of optical and mechanical elements were needed to perform roughness tests on surfaces, it is an object of the present invention to perform surface roughness measurements by optical means.

A particular object of the present invention is to test the hardness of surfaces by the measurement of the indentations thereof.

Another particular object of the present invention is to measure the roughness or hardness of a surface by optical means and then record it on a digital indicator.

Upon further study of the specification, drawings and claims, other objects and advantages of the present invention will become apparent.

Those portions of a light reflecting surface which are inclined to an ideal or theoretical surface will reflect or scatter a beam of incident light in a different direction than from the ideal surface. This fact is used in the present invention to obtain quantitative measurements of the sizes and inclinations of those portions of a surface which deviate from the desired ideal or theoretical surface.

In the method and apparatus of this invention, the surface that is to be examined is exposed to a bundle of incident light which is kept at a definite angle to the ideal or theoretical surface while the reflected light is separated into those beams which are reflected from the latter and those which are reflected or scattered from surface areas that are inclined to the latter. Information about the locations, dimensions and characteristics of the regions of deviation are then obtained from the direction and intensity of the light from the indented regions when a comparison is made with the light that is reflected from the ideal or theoretical surface.

The devices that are used for this purpose effect a geometric or polarisation separation of these two kinds of returning light from each other. Means are also provided for physical separation or identification of these two components of the light.

This invention also contemplates the use of a suitable monochromator for varying the wave length of the incident light, and/or a polarizer for determining the direction of polarization of the incident light, or a diaphragm which can be variable in size or can be adjustably positioned, or an optical system for varying the magnification in relation to the diaphragm. The invention also contemplates the possibility of using the adjusted size of the diaphragm opening or of its image as a measuring standard. For this purpose, a control system is provided to continually regulate the intensity ratio of the regularly and irregularly reflected light. Such a system is especially advantageous for use with hardness testers where the size of the indented surface area in relation to the applied force is a measure of the hardness of the material. In such a case the indented surface area is the region of deviation from the ideal or theoretical surface.

BRIEF DESCRIPTION OF THE DRAWINGS

An understanding of the invention may be facilitated by reference to the drawings wherein.

DESCRIPTION OF THE PREFERRED EMBODIMENTS

Figure 1:
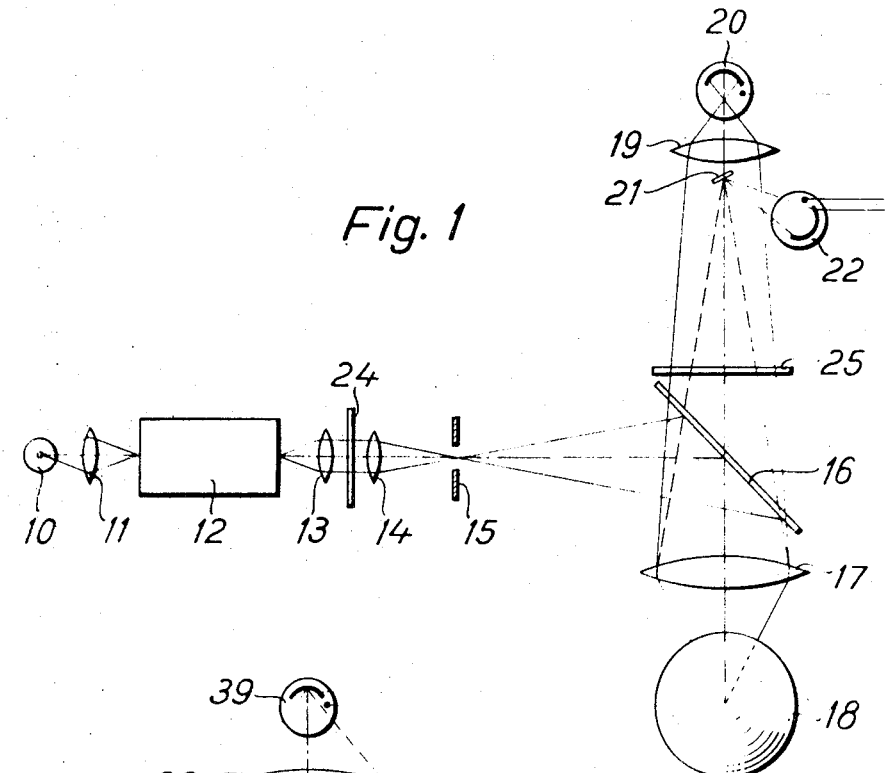
FIG. 1 is a schematic representation in elevation of an apparatus for observing geometric deviations on a spherical surface.

FIG. 1 shows an apparatus for observing geometric deviations of a spherical surface, e.g. of a ball bearing. A lamp 10 sends its light through a condenser 11, a monochromator 12, collector lenses 13 and 14, and a diaphragm 15, to a partly transparent mirror 16, the reflected light from which passes through an objective 17 and converges upon the surface of the spherical ball 18 under examination. The ball 18 is in such a position that the light from the objective 17 comes virtually to a focus at the center of the mirror like reflecting ball. The rays of light that are reflected from the irregular parts of the surface of the ball are sent through objective 17, mirror 16 and field lens 19 to a photoelectric receiver 20. A small mirror 21 is mounted in front of the lens 19 in a position to intercept and send to the photoelectric receiver 22 the light that is reflected from the ideal spherical surface of the ball 18. The size and position of the mirror 21 corresponds to the size and position of the opening in the diaphragm 15, an image of which is formed by the lens 17 in the plane of the center of the ball 18. The outgoing signals from the two receivers give an indication of the relative areas (within the field of observation that is determined by the aperture of objective 17) of the ideal spherical portions and the deformed portions of the surface of the ball 18.

In order to separate that portion of the light which is scattered from the deformed parts of the surface from dielectric inclusions or deformations which are much smaller than the wave length and which depolarize the light, a polarizer 24 is positioned in the path of the incident light. The necessary analyzer 25 is then preferably placed behind the partly transparent mirror 16. With the polarizer positioned transversely of the analyzer, the photoelectric receiver 20 is reached by only the depolarized portion of the light. If, however, the analyzer is positioned parallel to the polarizer, the light that is reflected from the deformed parts of the spherical surface and which is previously stopped by the transversely positioned analyzer, then passes through the latter and reaches the photoelectric receiver 20.

To obtain information about the scattering centers of the reflecting surface, a monochromator is used for illuminating the object with different wave lengths. It is known that the scattered portion of the light increases with a high power of the wave length. The ratio of the size of the light scattering center to the wave length of the light is also considerable, as it affects the dispersing characteristics. Measurements with different wave length of light therefore give information about the size distribution of the scattering centers.

Instead of two photoelectric receivers, the measurements are made with onyl one receiver by directing the two light beams to it alternately and by adjusting the intensity of the light, after each change, so that the ratio of the light flux reduction to equalize the two intermittent light fluxes is proportional to the area being measured.

Figure 2:
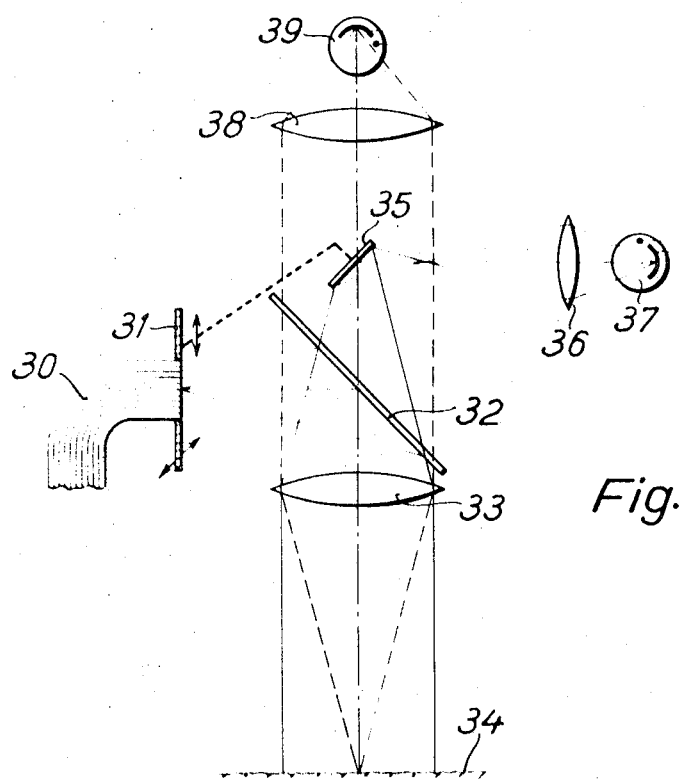
FIG. 2 is a schematic representation in elevation of an apparatus for making measurements on a flat surface.

FIG. 2 shows an arrangement for making measurements on flat surfaces. Here the light is directed through an opening in a diaphragm 31 by a bundle of fibers, the diaphragm being adjustable in the size of its opening and also in the position that it occupies. The light which passes through the diaphragm, after being reflected by a partly transparent mirror 32 and passing through an objective 33, is directed in the form of a parallel ray bundle upon the surface 34 that is being examined. Those rays of light which are reflected from the ideal flat portions of the surface return along the paths according to the reflection laws of a plane mirror and after traversing the same objective 33 and beam splitter 32, impinge upon an inclined mirror 35 which directs them through a lens 36 to a photoelectric receiver 37. The mirror 35 is adjustable in the focal plane of the objective 33 and is connected with the diaphragm 31 so that when the position of the diaphragm is shifted, its image remains permanently on the mirror 35.

Behind the mirror 35 a field lens 38 is positioned to bring the opening of the objective 33 to a focus on the receiver 39. This focus includes those rays which are reflected or scattered from the distorted portions of the surface 34. With this arrangement it is possible, by changing the direction of illumination, to match the illumination to get information on pronounced directions of the surface irregularities. The responses from the receivers 37 and 39 indicate which portions of the surface 34 are sufficiently close to the ideally flat surface and which portions have deformations.

Figures 3, 4:
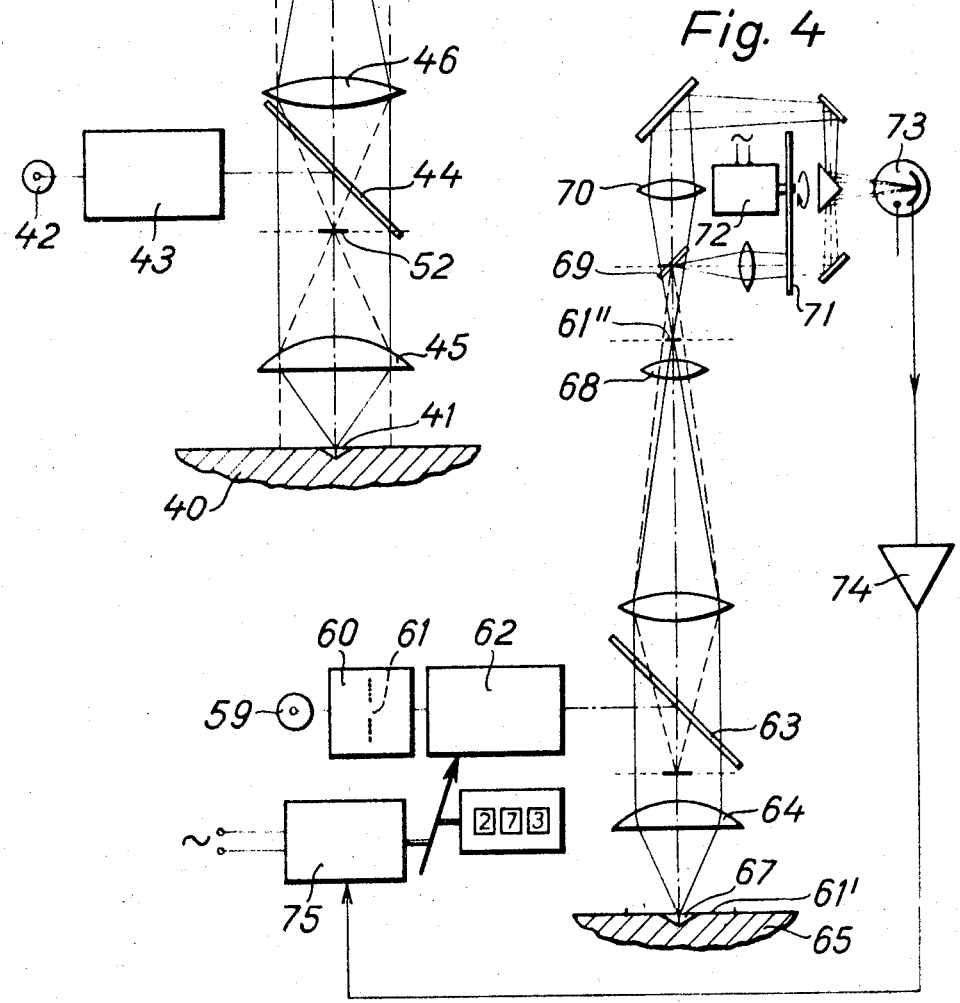
FIG. 3 is a schematic representation in elevation of an apparatus for testing hardness by measuring penetrations into a flat surface.
FIG. 4 illustrates a modification of the apparatus of FIG. 3, wherein roughness or hardness of a surface is recorded on a digital indicator.

FIG. 3 shows the application of the new method as a hardness tester. The object 40 has a pyramidoidal depression 41. A lamp 42 is used for illumination. The light from lamp 42 reaches the object 40 after passing through a Kohler illuminator 43, a partially transparent mirror 44 and an ∞-objective 45 of higher aperture. The first image of the front diaphragm of the illuminator is in the plane of the objective 40, namely in the front focal plane, while the first image of the aperture diaphragm is in the rear focal plane 52 of the objective 45. The partly transparent mirror 44 has immediately behind it a telescopic lens 46 which in conjunction with the objective 45 forms an image 41' of the depression 41 in the focal plane of lens 46. In front of the latter is positioned a field lens 47 which in conjunction with the lens 46 forms across the mirror 48 upon a plate 49 an image of the rear focal plane 52, namely of the surrounding field of the object 40 through the outlet pupil of the objective 45. The plate 49 has a uniform optical thickness throughout its entire area to avoid phase shifting inside the pupil which would cause image distortions.

In order to permit the surrounding field to be easily distinguished during observation from the depression, they are colored differently. If the field around the depression is to appear "red," the central portion of the plate 49 (the size and position of which corresponds to the pupil surface that is illuminated by the Kohler illuminator) is colored red. If the remainder of the plate is colored green, then the depression appears green on a red background.

Behind the plate 49 there is an intermediate image forming objective 50 which transfers the image 41' to the ocular plane 41'' of the ocular 51. Devices (not shown) can then be used for measuring the size of the depression 41 in the image plane 41''.

Heretofore for hardness measurements the objective apertures were made so small that the indentation would appear black on a background of lighter color. Such shrinking of the aperture to obtain contrast has, however, resulted in an undesired loss of resolving power because the measurement of the indentations required the use of the fine details of the diagonal lines.

These difficulties are avoided by this new method wherein the observing aperture is increased to its largest technically realizable size.

In the modification of this new method shown in FIG. 4, the light from a lamp 59 is transmitted through a Kohler illuminator 60 with a viewing field diaphragm 61, an optical regulator 62, a partially transparent mirror 63 and an objective 64, and is impinged upon an object 65 where it illuminates a viewing field 61' which also contains the indentation 67 of the pyramidal hardness testing diamond. An image 61'' of this viewing field is formed by the telescopic lens 66 in a focal plane of lens 66. An image of the aperture diaphragm (not shown) of the Kohler illuminator is formed in the rear focal plane of the objective 64. This diaphragm is of such size that the light rays which are reflected from the four sides of the pyramidal indentation 67 are distributed around the image of the aperture diaphragm.

The focal plane 61'' has positioned in front of it a field lens 68 to bring the rear focal plane of the lens 64 to a conjugated focus in a plane through the center of an inclined mirror 69. The position and size of this mirror is the same as that of the image of the aperture diaphragm of the Kohler illuminator. The mirror 69 throws into one of the optical paths of a flicker photometer the light which is regularly reflected from the surface of the object 65 within the area 61' of the viewing diaphragm. A lens 70 throws into the other optical path of the photometer a beam of light that is proportional to the area of the indentation. The switching between these two light paths of the photometer is effected by a rotary diaphragm 71 driven by a synchronous motor 72. After passage through an A.C. amplifier 74, the outgoing signals of the photoelectric receiver 73 of the photometer are delivered to a servomotor 75 which is energized in synchronism with the motor 72. The motor 75 actuates an optical regulator 62 which equalizes the intensities of the two beams of light that enter the photometer by keeping the area of the indentation equal to the illuminated area of the surrounding field. A simultaneously operated digital indicator gives a numerical estimate of the size of the indentation.

If the hardness of the object is to be indicated by the counter directly, then this is done by providing the counter with an indentation force proportionality factor.

The devices shown in the drawings are obviously intended to be equipped with suitable viewing aids to permit direct visual inspection of the object under examination, since this is sometimes necessary to assist in the selection of an area that is suitable for testing.

It will be understood that this invention is susceptible to modification in order to adapt it to different usages and conditions and, accordingly, it is desired to comprehend such modifications within this invention as may fall within the scope of the appended claims.

I claim:
1. An apparatus for determining the size of geometric deviations of a reflecting surface from an ideal surface comprising:
   (a) means for exposing an extended area of said reflecting surface to light rays of definite solid small angle and image area in a perpendicular direction to the ideal surface, including a light source and means for projecting light from said source onto said reflective surface;
   (b) means for separating light reflected from said reflecting surface into a first component of small solid angle which is equal to the incident illumination angle spread and comprising light regularly reflected from said ideal surface, and a second component having a large solid angle which is extended in a high ratio to the illuminating angle spread and comprising light irregularly diffused from said deviations from the ideal surface;
   (c) first photosensing means for measuring the light regularly reflected from said surface;
   (d) second photosensing means for measuring the light diffusely reflected from said surface; and
   (e) indicating means for indicating the output of said first and second photosensing means as an indication of the geometric deviations of the reflecting surface.

2. The apparatus of claim 1, wherein said means for exposing said reflecting surface includes a monochromator and a polarizer, and wherein said means for separating light reflected from said reflecting surface comprises an analyzer.

3. The apparatus of claim 1, wherein said means for exposing said reflecting surface includes a monochromator and wherein said means for separating light into first and second components comprises means for discriminating between light of different wavelengths.

4. The apparatus of claim 1, wherein the means for exposing said reflecting surface includes means for changing the illuminated area and direction of incidence of said light rays according to the relation of the separated components.

5. An apparatus for determining the size of geometric deviations of a reflecting surface from an ideal surface comprising:
   (a) means for exposing an extended area of said reflecting surface to light rays of definite solid small angle and image area in a perpendicular direction to the ideal surface, including a light source and means for projecting light from said source onto said reflective surface;
   (b) means for separating light reflected from said reflecting surface into a first component of small solid angle which is equal to the incident illumination angle spread and comprising light regularly reflected from said ideal surface, and a second component having a large solid angle which is extended in a high ratio to the illuminating angle spread and comprising light irregularly diffused from said deviations from the ideal surface;
   (c) a photoelectric receiver for measuring the light regularly reflected and diffusely reflected from said surface and means for alternately allowing said photoelectric receiver to measure the light regularly reflected and diffusely reflected from said surface; and
   (d) indicating means for indicating the output of said photoelectric receiver as an indication of the geometric deviations of the reflecting surface.

References Cited

UNITED STATES PATENTS

| 2,735,331 | 2/1956 | McMaster et al. | 356—120 |
| 3,081,665 | 3/1963 | Griss et al. | 356—120 |
| 3,229,564 | 1/1966 | Meltzer | 356—210 |
| 3,323,411 | 6/1967 | Killpatrick | 356—114 |
| 3,401,590 | 9/1968 | Massey | 356—114 |
| 3,450,477 | 6/1969 | Meltzer | 356—114 |

FOREIGN PATENTS

| 1,080,432 | 12/1954 | France | 356—118 |
| 862,038 | 3/1961 | Great Britain | 356—209 |
| 182,537 | 2/1963 | Sweden | 356—209 |
| 1,120,750 | 12/1961 | Germany | 356—209 |
| 802,596 | 7/1949 | Germany | 356—114 |

OTHER REFERENCES

Clark et al.: "Goniometric Spectrometer . . ." J.O.S.A. v. 43, No. 11, November 1953, pp. 993–998.

RONALD L. WIBERT, Primary Examiner

W. A. SKLAR, Assistant Examiner

U.S. Cl. X.R.

356—120, 209, 212